Nov. 19, 1963    G. W. MOUK    3,111,412
METHOD FOR PACKAGING PERISHABLE COMESTIBLES AND PRODUCT
Filed April 6, 1960

INVENTOR.
George W. Mouk
BY
*ATTORNEY*

United States Patent Office 3,111,412
Patented Nov. 19, 1963

3,111,412
METHOD FOR PACKAGING PERISHABLE
COMESTIBLES AND PRODUCT
George W. Monk, West Monroe, La., assignor to Bancroft Paper Co., Inc., West Monroe, La., a corporation of Louisiana
Filed Apr. 6, 1960, Ser. No. 20,417
4 Claims. (Cl. 99—192)

This invention relates to an improved method and means for packaging perishable comestibles, such as poultry, fish and vegetables.

In the food industry there are two general methods employed to package perishable food stuffs to preserve their fresh condition and quality until ultimate consumption. One of these methods is the widely employed "quick" or "deep freezing" process. In such method the comestibles, for example, fish, meats or vegetables, in unsterilized fresh condition, are subjected to reduced temperatures so as to quickly convert the food product to a frozen and compact solid state, packaged within small, individual waxed cartons, and transported in refrigerated cars or trucks to retail establishments, where the cartons are stored in refrigerated cabinets, and subsequently transferred to a household freezer or refrigerator by the purchaser, until ultimate consumption. As a general rule such products are frozen at a minimum temperature of between about minus 10° F. and plus 5° F. This low temperature insures the inactivation of the microorganisms normally associated with the particular foodstuffs, and additionally builds up or accumulates in the relatively frozen, densely packed product a substantial quantum of latent cold, which to a very considerable degree compensates or allows for some loss of cold during transportation and marketing of the product. In relatively bulky comestible units, such as whole dressed poultry, leafy vegetables, and the like, the preservation process involves the initial refrigeration of the product to an extent sufficient to prevent microbial activity and consequent spoilage or impairment of quality and flavor, but not necessarily to the drastic degree used in the "deep freeze" method. With such products a desideratum is to provide a packaging method which will retail the packaged product in chilled condition, and in its original texture by preventing dehydration, with consequent shrinkage and loss of natural flavor of the products. This second method usually involves the use of wooden or paper board cartons, in which the food product is relatively loosely packed in individual unconsolidated units in direct association or contact with discrete wet ice, the major function of which is to maintain a desirable ambient temperature (about 30° F.) and a desirably high ambient partial pressure of water vapor, or high relative humidity, to inhibit dehydration and loss of normal or natural water content of the packaged product to thus insure its plumpness, as in the case of poultry, and crisp, non-wilted texture, as in the case of leafy vegetables. For example, in the past, in the shipment of dressed poultry, lettuce, and the like, it has been the common practice to package the poultry in contact with wet ice within wooden crates lined with a water resistant material, such as waxed paper board, the essential purpose of which was to prevent discoloration of the poultry by the melted ice caused by leached components of the wooden crate. In this, and with similar methods, involving the direct contact of ice with the packaged product, numerous drawbacks obtain. The packed ice particles frequently cause bruising of the packaged product due to impact of the ice particles with the product, during handling and transportation of the package. Furthermore, the melted ice directly wets the packaged product, tending to impair its texture and to abstract cold from the product, thereby increasing the possibility of spoilage. In such circumstances the packaged products may be rendered unesthetic in appearance, with reduction in gastronomic appeal and dietetic value. Although prior suggestions included the provision of drainage orifices in the package, such expedient only partially mitigated the above noted disadvantages.

The present invention is directed to a novel method of packaging perishable comestibles under conditions which pre-establish and insure a desirable high ambient humidity in the packaged environment of the comestibles while obviating direct contact of the packaged product with a solid liquifiable refrigerant. The invention comprehends the concept of enclosing pre-chilled or refrigerated food stuffs, such as dressed poultry, lettuce, and the like, within a special unitary wrapper, out of contact with any liquifiable refrigerant, which wrapped or enclosed food stuff is packed within a cellulosic shipping carton. In this assembled package, the unitary wrapper serves not only to pre-establish and maintain a desirable ambient humidity about the packaged products but it also protects the cellulosic carton from contact with any condensed moisture which may be formed within the wrapper.

An object of the invention is to provide an improved, economical and effective method of packaging refrigerated comestibles which inhibits any substantial dehydration or shrinkage of such cosmestibles, during transportation and storage.

Another object of the invention is to provide a method of packaging refrigerated comestibles in an ambient atmosphere of relatively high humidity derived from a component of a transportation carton containing the comestibles.

Yet another object of the invention is to provide a novel package unit including refrigerated, perishable articles wherein a high humidity environment is established and maintained about the articles to preserve and retain the natural moisture content thereof.

A further object of the invention is to provide an improved shipping container for perishable refrigerated comestibles, wherein a high humidity environment is established and maintained within the container without involving liquiescence of a solid refrigerant.

Yet a further object of the invention is to provide an improved shipping container for refrigerated poultry, wherein dehydration and shrinkage of the poultry is inhibited by maintenance of a high ambient humidity within the container.

A still further object of the invention is to provide an improved shipping container for refrigerated poultry, wherein dehydration and shrinkage of the poultry is inhibited by maintenance of a high ambient humidity within the container, and bruising and discoloration of the poultry is prevented.

With these and other objects in view, which may be incident to my improvements, the invention consists in the parts and combinations to be hereinafter set forth and claimed, with the understanding that the several necessary elements, comprising my invention, may be varied in construction, composition and arrangement, without departing from the spirit and scope of the appended claims.

In order to make my invention clearly understood, I have shown in the accompanying drawings means for carrying the same into practical effect, without limiting the improvements in their useful applications to the particular constructions, which for the purpose of explanation, have been made the subject of illustration.

Figure 1:
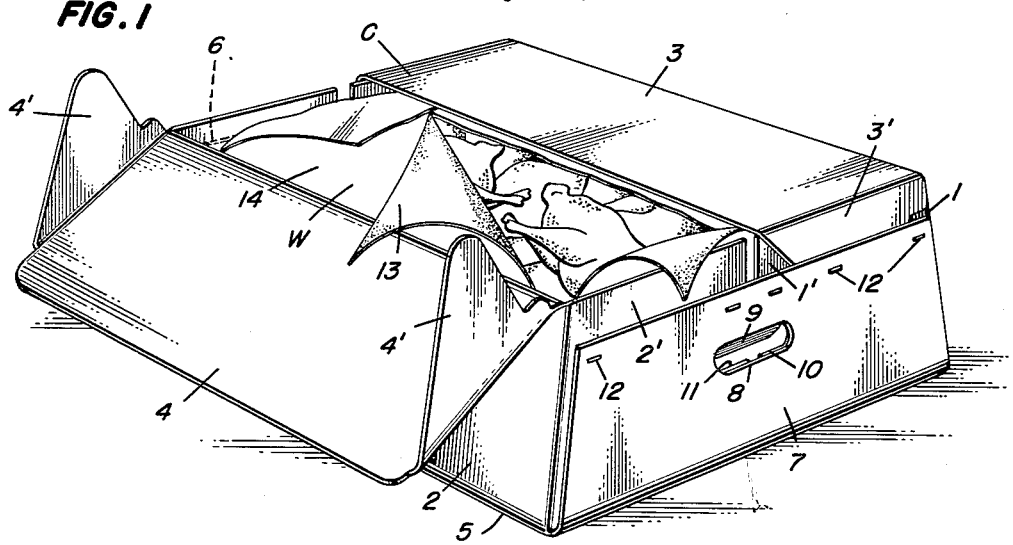
FIGURE 1 is a perspective view of a shipping container, showing a carton and associated liner, with dressed poultry wrapped therein.

Referring to the drawings, and more particularly to FIG. 1, the carton C may be formed from any suitable knock-down paper board stock, preferably from a single blank of conventional corrugated paper board, appropriately cut and scored so as to provide, when assembled, a rectangular shaped, substantially rigid container comprising side walls 1 and 2, having terminal flaps 1' and 2', closure flaps 3 and 4 having terminal locking flaps 3' and 4', a bottom panel 5, and end walls 6 and 7, each of said end walls being formed with a centrally positioned handhold 8, including a scored flap 9, adapted to be forced inwardly of the end wall, and between the cut out portions 10 and 11, formed in each of the flaps 1' and 2'.

The carton is assembled by folding the side and end walls into the position shown in FIG. 1, with the flaps 1' and 2' located within and parallel to the contiguous end walls 6 and 7, respectively, and the upper portions of the end walls are then stapled to the flaps by means of suitably spaced staples 12.

Figure 2:
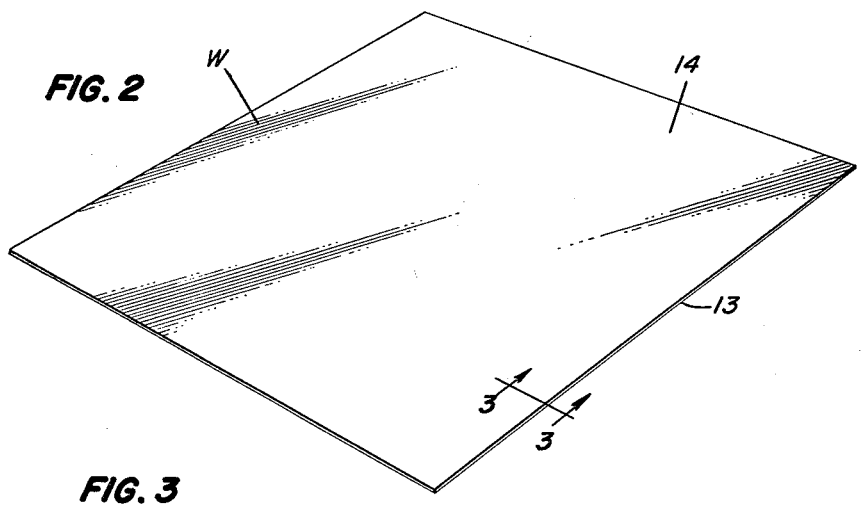
FIG. 2 is a perspective view of the unitary, composite wrapper or liner.
Figure 3:
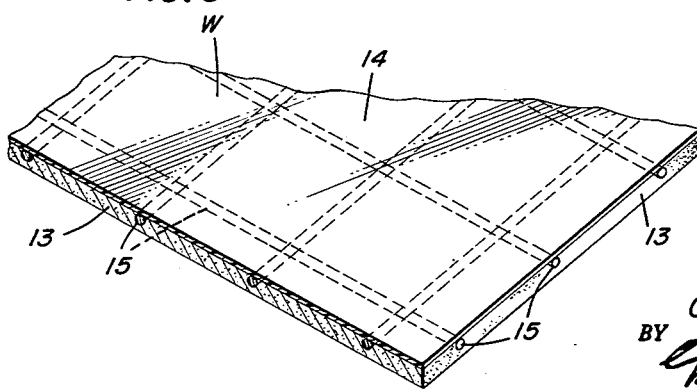
FIG. 3 is an enlarged cross-sectional view along line 3—3 of FIG. 2.

Referring to FIGS. 2 and 3, the liner or wrapper W, used in combination with the carton C, comprises a unitary composite sheet structure incorporating a water absorbent component, preferably in the form of a relatively thick batt 13 consisting of randomly oriented, uncompressed, highly water-absorptive cellulosic fibers, which batt is bonded to a continuous thin sheet or film 14 of water-resistant and moisture vapor impermeable synthetic resin mainly through an interposed grid 15 comprised of thermoplastic, relatively high strength fibers, which are autogenously thermally bonded to the material of the film 14. The film functions as a flexible, somewhat elastic carrier for the absorptive sheet or batt 13 and as a moisture and moisture vapor barrier between the ambient atmosphere and the batt, thus preventing transmission of water and water vapor from the batt through the film 14, when the liner sheet is in its folded packaged condition.

In carrying out the improved method of the present invention, the carton is assembled, as above described, and the wrapper W is inserted therein, with the water-resistant film 14 adjacent the inner surfaces of the carton; the selected refrigerated comestibles, for example, dressed poultry, fish, lettuce or the like, is then arranged within the wrapper in layers and rows, as best adapted for optimum utilization of the capacity of the carton; the batt 13 of the wrapper is then wetted with an aqueous solution up to, or short of its saturation point, and the upper free end and side portions of the wrapper are folded over the packaged food, the wrapper being of such dimensions that the free upper portions thereof overlap so as to completely enclose the selected comestible. The carton is closed by folding down the top closure flaps 3 and 4, while wedging the locking flaps 3' and 4' between the stapled end walls 6 and 7 of the inturned side wall flaps 1' and 2'. The closure flaps 3 and 4, may be secured in closed position in any suitable manner, as by stapling, or by application of gummed tape.

As previously noted, the prime function of the highly absorptive batt 13 is to provide and establish a reservoir of aqueous liquid in a matted structure of high intrinsic water absorptibility and capillarity, whereby to insure optimum evaporation or evolution of water vapor and its diffusion into the ambient area within the confines of the folded wrapper, and to pre-establish and maintain a desirable high humidity or high partial pressure of water vapor within the packaged environment, which high humidity is essentially maintained by reason of the water vapor impermeability of the film. Accordingly, the batt is desirably composed of purified cellulose fibers, and is preferably made from a furnish comprised of mixtures of sulfite and/or sulfate fibers. It will be understood that the quantity of water vapor which may be introduced into the atmosphere within the folded wrapper may be varied over a relatively wide range and will depend on such factors as the degree of absorption of the fibers constituting the batt, the thickness and degree of compaction of the batt and the size of the wrapper sheet.

The aqueous solution employed to wet the batt may be tap water, a saline solution of selected freezing point, an aqueous solution of acromyosin, or other water soluble antibiotics, or an aqueous solution of germicidal quaternary amines, such as cetyl pyridinium chloride, benzylkonium chloride, and the like. It will be appreciated that the germicidal agents employed in these solutions function to destroy any bacteria which may be present in the condensate formed within the package and thereby prevent bacterial action with resultant bacterial development of odors. The quaternary amines are the preferred antimicrobial agents because of their broad germicidal spectrum, high germicidal potency in minor concentrations (150–250 p.p.m.), and their substantivity to cellulose. Additionally, these compounds are odorless, and substantially non-volatile.

The water-resistant, moisture vapor-impermeable film 14 preferably comprises a polyethylene of low or intermediate density, but may, if desired, be composed of other plasticizable synthetic resins having the desired characteristics of water repellancy and moisture vapor impermeability such, for example, as polyvinylchloride, polyvinylchloride-acetate copolymer, polyvinylidene chloride, polystyrene, and the like. Because of their extremely low water absorption, high moisture vapor impermeability, high bursting and tensile strength, excellent performance at low temperatures, low thermal conductivity and ready adaptability to extrusion lamination, polyethylene and polyvinylidene chloride-vinyl chloride copolymer are the resins of choice for the film material.

The filamentary grid 15, which is bonded to the batt 13 and to the film 14, respectively, confers improved physical properties on the unitary composite liner, and more particularly functions as a re-enforcing component imparting high tear strength to the wrapper W, thus permitting folding of the wrapper and the application of considerable stress thereon during its insertion in the carton and during folding into a closed package, without danger of rupture of the relatively thin moisture barrier film.

The filaments of the intermediate grid may comprise any of the above enumerated thermoplastics in oriented filamentary or fiber form, so as to provide a mesh or grid structure of high tensile strength directly bonded to the film. The grid structure may comprise separate filaments of any selected dernier which are interwoven or simply overlaid, and thermally fused at their several points of contact. While a grid structure of thermoplastic filaments is the preferred strength-imparting and bonding means, it will be appreciated that the same general effect may be achieved by other specific methods as, for example, employing an open mesh scrim of natural fibers precoated or preimpregnated with a thermoplastic resin which is compatible with the resin used for the film.

The absorptive batt 13, grid 15, and film 14, may be formed into a unitary composite wrapper W by any of the current conventional techniques, for example, extrusion lamination or by calendering.

While I have shown and described the preferred embodiment of my invention, it is to be understood that this embodiment is for purposes of illustration of the principles of the invention, and not as limiting its useful scope, since it is apparent that changes and variations may be made therein by those skilled in the art, without departing from the spirit of the invention or the scope of the appended claims.

I claim:

1. A method of packaging perishable comestibles including fish, meat, poultry and vegetables for shipment under refrigeration which comprises, providing a substantially rigid transportation carton, fitting within the carton a composite flexible wrapper having a continuous water resistant, moisture-vapor impermeable film lying adjacent the interior of the carton and a bonded substantially uncompressed, highly water-absorbent batt of cellulosic fibers, introducing refrigerated comestibles into the wrapper, wetting the batt with water, folding the wrapper to overlap itself and completely enclosing the comestibles and closing the carton.

2. A package for shipment of selected food products including fish, meat, poultry and vegetables under refrigeration comprising a paper board carton and a unitary wrapper enclosing a number of units of the selected food product, fitted within the carton, said wrapper comprising a water-wetted sheet of highly water-absorptive, relatively uncompressed, matted cellulosic fibers bonded to a continuous flexible film of water resistant, moisture vapor-impermeable thermoplastic resin, the said water resistant film lying adjacent the interior surface of the carton.

3. A package in accordance with claim 2, in which the thermoplastic resin is chosen from the group consisting of polyethylene and polyvinylidene chloride-vinyl chloride copolymer.

4. A package in accordance with claim 2, in which the water wetted sheet contains an anti-microbial agent chosen from the group consisting of antibiotics and quaternary amines.

References Cited in the file of this patent

UNITED STATES PATENTS

| | | |
|---|---|---|
| 1,140,178 | McDougall | May 18, 1915 |
| 2,011,426 | Taylor et al. | Aug. 13, 1935 |
| 2,110,410 | Westby et al. | Mar. 8, 1938 |
| 2,470,465 | Broeren et al. | May 17, 1949 |
| 2,559,109 | Bonini | July 3, 1951 |
| 2,578,150 | Rathke | Dec. 11, 1951 |
| 2,632,723 | Bennett | Mar. 24, 1953 |
| 2,849,322 | Brucker | Aug. 26, 1958 |

OTHER REFERENCES

"Refrigerating Engineering" February 1954, page 46, article entitled Packaging and Wrapping Materials.